United States Patent [19]
Lambert et al.

[11] Patent Number: 5,112,700
[45] Date of Patent: May 12, 1992

[54] PHOSPHOR COMPOSITION AND X-RAY INTENSIFYING SCREEN CAPABLE OF EMITTING PRINCIPALLY IN THE SPECTRAL REGION OF NATIVE SILVER HALIDE SENSITIVITY

[75] Inventors: Patrick M. Lambert, Rochester; Philip S. Bryan, Webster; Gregory S. Jarrold, Henrietta; Christine M. Towers, Rochester, all of N.Y.

[73] Assignee: Eastman Kodak Company, Rochester, N.Y.

[21] Appl. No.: 706,510

[22] Filed: May 28, 1991

Related U.S. Application Data

[63] Continuation-in-part of Ser. No. 556,588, Jul. 20, 1990, abandoned.

[51] Int. Cl.$^5$ ............... B32B 19/00; C09K 11/67
[52] U.S. Cl. ................. 428/690; 428/917; 252/301.4 F; 252/301.4 H; 252/301.5; 250/483.1
[58] Field of Search .......... 428/690, 917, 457; 250/483.1; 252/301.4, 301.5, 301.4 H, 301.4 F, 301.4 R

[56] References Cited
U.S. PATENT DOCUMENTS

| | | | |
|---|---|---|---|
| 2,542,336 | 5/1945 | Kroger et al. | 252/301.4 |
| 4,112,194 | 9/1978 | Chenot et al. | 428/539 |
| 4,988,880 | 1/1991 | Bryan et al. | 250/483.1 |
| 4,988,881 | 1/1991 | Bryan et al. | 250/483.1 |
| 4,996,003 | 2/1991 | Bryan et al. | 252/301.4 F |

OTHER PUBLICATIONS

L. H. Brixner, "Structural and Luminescent Properties of the Ln$_2$Hf$_2$O$_7$-type Rare Earth Hafnates", Mat. Res. Bull., vol. 19, pp. 143-149, 1984.

Primary Examiner—James J. Seidleck
Assistant Examiner—Charles R. Nold
Attorney, Agent, or Firm—Carl O. Thomas

[57] ABSTRACT

A phosphor composition is disclosed containing a titanium activated hafnium zirconium germanate phosphor which emits electromagnetic radiation principally in the spectral region to which silver halide exhibits native sensitivity. To maximize the intensity of emission the ratio of host metals satisfies the relationship:

$$D_{1+x}Ge_{1-x}$$

where
D is the combined sum of zirconium and halnium and
x is 0.25 to −0.70.

An X-ray intensifying screen is disclosed containing the phosphor composition.

24 Claims, 1 Drawing Sheet

PHOSPHOR COMPOSITION AND X-RAY INTENSIFYING SCREEN CAPABLE OF EMITTING PRINCIPALLY IN THE SPECTRAL REGION OF NATIVE SILVER HALIDE SENSITIVITY

CROSS REFERENCE TO RELATED APPLICATION

This application is a continuation-in-part of U.S. Ser. No. 556,588 filed Jul. 20, 1990, now abandoned.

FIELD OF THE INVENTION

The invention relates to novel X-ray intensifying screens. More specifically, the invention relates to fluorescent screens of the type used to absorb an image pattern of X-radiation and to emit a corresponding pattern of longer wavelength electromagnetic radiation for imagewise exposure of a silver halide radiographic element. The invention is also directed to a novel phosphor composition.

BACKGROUND OF THE INVENTION

A developable latent image is formed in a silver halide emulsion layer of a radiographic element when it is imagewise exposed to X-radiation. However, much of the highly energetic X-radiation simply passes through the radiographic element without being absorbed. The useful native sensitivity (i.e., maximum absorption capability) of silver halide emulsions lies in the near ultraviolet (300-400 nm) and blue (400-500 nm) portions of the spectrum. The native sensitivity of silver chloride is negligible beyond 450 nm, with sensitivity dropping approximately 2 orders of magnitude between 380 and 420 nm. The native sensitivity of silver bromide is negligible beyond 500 nm, with sensitivity dropping approximately 2 orders of magnitude between 450 and 490 nm. The native sensitivity of silver bromoiodide (3 mole % iodide) is negligible beyond 550 nm, with sensitivity dropping approximately 2 orders of magnitude between 470 and 530 nm. Thus, not only do silver halides fail to absorb efficiently in the green portion of the spectrum, the absorption of silver halides in the longer wavelength regions of the blue spectrum are relatively limited.

It is, of course, known that the spectral response of silver halide emulsions can be extended into the green and red portions of the spectrum by adsorbing one or more spectral sensitizing dyes to the surfaces of the silver halide grains in the emulsions. Although routine, spectral sensitization is not without its disadvantages. The dyes themselves are complex organic molecules that, on a weight basis, are more expensive that silver, but, unlike silver, are not recoverable for reuse. Further, emulsion addenda that also adsorb to grain surfaces, such as antifoggants and stabilizers, can displace the dyes, leading to reduced spectral sensitivity.

To reduce patient exposure to X-radiation it is conventional practice in medical radiology to employ silver halid in combination with intensifying screens, where the intensifying screen contains a phosphor layer that absorbs X-radiation more efficiently than silver halide and emits longer wavelength electromagnetic radiation which silver halide can more efficiently absorb. Blue emitting intensifying screens capable of imagewise exposing silver halide radiographic elements within the spectral region of native grain sensitivity are known in the art. Although many blue emitting phosphors are known, calcium tungstate has for many years been the standard blue emitting phosphor for use in intensifying screens against which blue emitting intensifying screens have been compared.

Kroger et al U.S. Pat. No. 2,542,336 discloses phosphors containing titanium as an activator and having a matrix comprised of one or more of the oxides of zirconium, hafnium, thorium, germanium or tin to which may be added either acid oxides or basic oxides or both. Disclosed basic oxides are the oxides of sodium, potassium, rubidium, cesium, lithium, barium, calcium, strontium, magnesium, beryllium and zinc. Disclosed acid oxides are $SO_3$, $B_2O_3$, $P_2O_5$ and $SiO_2$. Titanium activated zirconium oxide, magnesium stannate, calcium zirconate and zirconium phosphate are each specifically disclosed.

Titanium activated germanium oxide is a blue emitting phosphor, but investigations, undertaken in connection with this invention and included among comparative examples below, have revealed titanium activated germanium oxide to exhibit low emission intensities.

Titanium activated hafnium oxide exhibits peak emission in the longer wavelength (approx. 475 nm) blue portion of the spectrum, with a substantial portion of its total emission extending into the green region of the spectrum. L. H. Brixner, "Structural and Luminescent Properties of the $Ln_2Hf_2O_7$-type Rare Earth Hafnates", Mat. Res. Bull., Vol. 19, pp. 143-149, 1984, after reporting the properties of $Ti^{+4}$ as an activator for rare earth hafnates, noted a high level of performance for titanium activated optical grade hafnia ($HfO_2$), but considered the phosphor impractical for intensifying screen use based on the price of optical grade hafnia. Optical grade hafnia contains less than $3 \times 10^{-4}$ mole of zirconia ($ZrO_2$) per mole of hafnia.

Bryan et al U.S. Pat. No. 4,988,880 discloses that efficient X-ray intensifying screens can be constructed from titanium activated hafnia phosphors containing minor amounts of zirconium, but higher amounts than found in optical grade hafnia, specifically:

$$Hf_{1-z}Zr_z$$

where z ranges from $4 \times 10^{-4}$ to 0.3. Sharp losses in emission intensities were found at higher values of z.

Phosphors which contain germanium, zirconium or hafnium and oxygen being complexed with other nonmetals, such as sulfur, boron, phosphorus, silicon and the like, produce distinctly different crystal structures than those of hafnium and/or zirconium germanate and are not considered relevant to this invention.

Bryan et al U.S. Pat. No. 4,988,881 discloses the preparation of lithium hafnate phosphors. In the preparation of the lithium hafnate phosphor hafnia has been also formed as a secondary phase.

SUMMARY OF THE INVENTION

It is an object of this invention to provide an X-radiation intensifying screen having a high emission intensity with its spectrum of electromagnetic radiation emission principally in the spectral region to which silver halide exhibits native sensitivity.

Alternately stated, a higher proportion of the total emission of the X-radiation intensifying screens of this invention lies in the spectral region to which silver halide possesses native sensitivity as compared to titanium activated hafnia and/or zirconia phosphor containing screens. When the emissions of the screens of this invention are compared to the emissions of titanium activated hafnia and/or zirconia phosphor containing screens in the spectral region to which silver halide possesses native sensitivity, higher intensities for the intensifying screens of the invention are realized.

In one aspect, the invention is directed to an intensifying screen comprised of a support and a fluorescent layer containing a phosphor capable of absorbing X-radiation and emitting electromagnetic radiation principally in the spectral region to which silver halide exhibits native sensitivity. The intensifying screen is characterized in that the phosphor is titanium activated hafnium zirconium germanate in which hafnium, zirconium and germanium satisfy the relationship:

$$D_{1+x}Ge_{1-x}$$

where

D is the combined sum of zirconium and hafnium and x is 0.25 to −0.70.

It is another object of the invention to provide a novel phosphor exhibiting a high emission intensity.

In a second aspect, this invention is directed to a phosphor composition comprised of titanium activated hafnium zirconium germanate in which hafnium, zirconium and germanium satisfy the relationship:

$$D_{1+x}Ge_{1-x}$$

where

D is the combined sum of zirconium and hafnium and x is 0.25 to −0.70.

DESCRIPTION OF PREFERRED EMBODIMENTS

All references to elements in terms of Group and Period designations are based on the designations assigned by the Periodic Table of Elements as adopted by the American Chemical Society.

Figure 1:
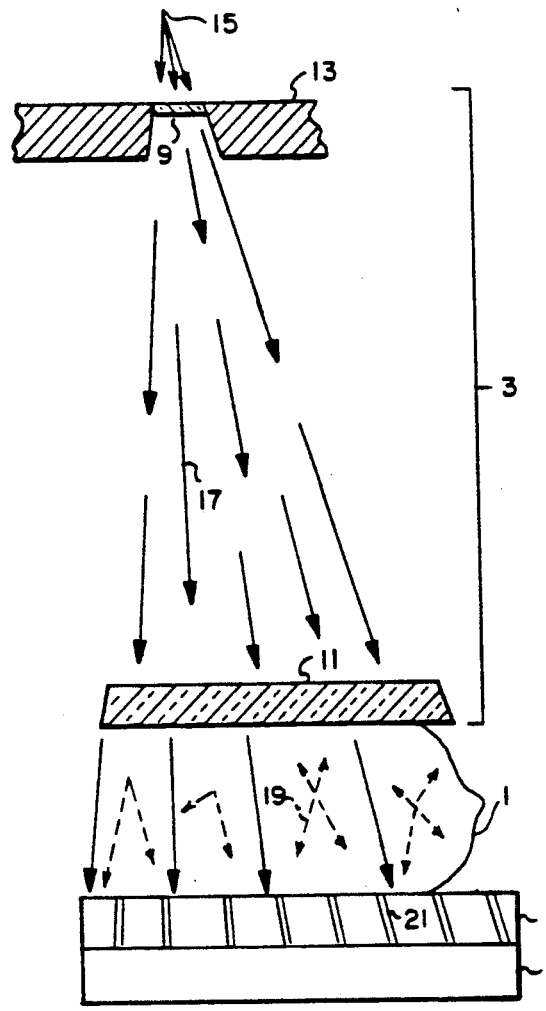
FIG. 1 is a schematic diagram of an imaging arrangement.

A typical arrangement for examining human tissue with X-radiation is illustrated in FIG. 1. Tissue 1 to be examined radiographically, in this instance a mamma (breast), is located between an exposure and compression arrangement 3 and an exposure grid 5. Beneath the grid is located an exposure recording assembly 7.

The exposure and compression arrangement is comprised of a radiation input window 9 (the output window of an X-radiation generating tube) and an output window 11 (the input window for supplying X-radiation to the subject), which are each substantially transparent to X-radiation. The output window acts as a compression element so that the mamma is held well compressed during examination. A wall 13 formed of a material having low penetrability to X-radiation joins the input window and defines with it an X-radiation field emanating from a tube or other conventional source, shown schematically as emanating from focal spot 15.

Unscattered X-radiation passing through the input and output windows and tissue to the grid is indicated by the solid arrows 17. Collisions of X-radiation with matter within the tissue results in part in absorption of the X-radiation and in part in redirecting the X-radiation. Redirected—i.e., scattered X-radiation—is illustrated schematically by dashed arrows 19.

The grid is equipped with vanes 21, which are relatively impenetrable by the X-radiation and arranged parallel to the unscattered X-radiation. The vanes permit almost all of the unscattered X-radiation to pass through the grid uninterrupted. X-radiation that has been slightly redirected is capable of passing through the grid also, but the most highly scattered X-radiation, which if left alone, would produce the greatest degradation in image sharpness, is intercepted and deflected by the vanes. The thickness and spacing of the vanes is exaggerated in FIG. 1 for ease of illustration. By vane construction and spacing the desired balance between the attenuation of X-radiation supplied to the exposure recording assembly and the sharpness of the image can be realized. To minimize X-ray attenuation the grid can be entirely eliminated, but a grid is usually preferred to improve sharpness. Suitable exposure grids are known and commercially available.

Figure 2:
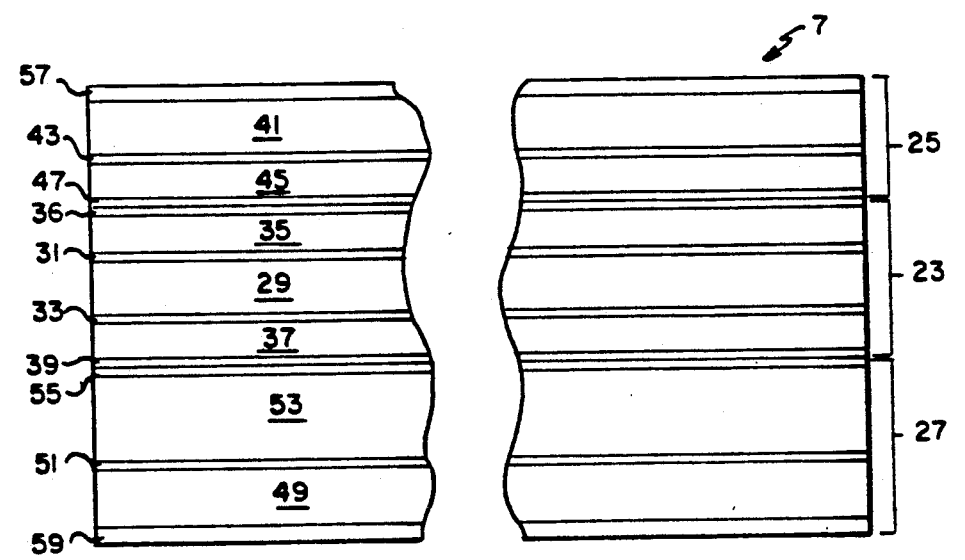
FIG. 2 is a schematic diagram of a dual coated radiographic element and a pair of intensifying screens forming an assembly.

In FIG. 2 the exposure recording assembly is shown in greater detail. A conventional case or cassette used to compress the elements of the assembly into close contact is not shown. The assembly consists of three separate elements, a dual coated silver halide radiographic element 23, a front intensifying screen 25 intended to be positioned between the radiographic element and an exposing X-radiation source, and a back intensifying screen 27.

As shown, the dual coated radiographic element consists of a support 29 including subbing layers 31 and 33 coated on its opposite major faces. Silver halide emulsion layers 35 and 37 overlie the subbing layers 31 and 33, respectively. Overcoat layers 36 and 39 overlie the emulsion layers 35 and 37, respectively.

As shown, the front intensifying screen is comprised of a support consisting of a substrate portion 41 and an interposed layer portion 43, a fluorescent layer 45, and an overcoat layer 47. Similarly, the back intensifying screen as shown is comprised of a support consisting of a substrate portion 49 and an interposed layer portion 51, a fluorescent layer 53, and an overcoat layer 55. Anticurl layers 57 and 59 are on the major faces of the front and back screen substrate portions 41 and 49, respectively, opposite the fluorescent layers.

In use, X-radiation enters the image recording assembly through the front screen anticurl layer 57 and substrate portion 41 passing uninterrupted to fluorescent layer 45. A portion of the X-radiation is absorbed in the front screen fluorescent layer. The remaining X-radiation passes through the overcoat layers 47 and 36. A small portion of the X-radiation is adsorbed in the silver halide emulsion layer 35, thereby contributing directly to the formation of a latent image in the emulsion layer. However, the major portion of the X-radiation received by the emulsion layer 35 passes through the support 29 and associated subbing layers 31 and 33 to the remaining silver halide emulsion layer 37. Again, a small portion of the X-radiation is absorbed in the remaining silver halide emulsion, thereby contributing directly to the formation of a latent image in this emulsion layer, and, again, the major portion of the X-radiation received by the emulsion layer 37 passes through the overcoat layers 39 and 55 to the fluorescent layer 53 of the back screen. The major portion of the X-radiation striking the back screen fluorescent layer is absorbed in this layer.

Exposing X-radiation is principally absorbed in the fluorescent layers 45 and 53 and reemitted by the fluorescent layers as longer wavelength electromagnetic radiation more readily absorbed by the silver halide radiographic element 23. Longer wavelength electromagnetic radiation emitted by the front intensifying screen fluorescent layer 45 exposes the adjacent silver halide emulsion layer 35. Longer wavelength electromagnetic radiation emitted by the back intensifying screen fluorescent layer 53 exposes the adjacent silver halide emulsion layer 37. These longer wavelength electromagnetic radiation exposures primarily account for the latent image formed in the silver halide emulsion layers.

From the foregoing, it is apparent that all of the layers above the fluorescent layer 53 must be penetrable by X-radiation to at least some extent. While the silver halide emulsion layers usefully absorb some X-radiation, the only other usefully absorbed X-radiation occurs in the front intensifying screen fluorescent layer. Thus, the supports and overcoat and subbing layers overlying the back intensifying screen are chosen to be as nearly transparent to exposing X-radiation as possible.

It is also apparent that the overcoat layers 36 and 47 separating the front intensifying screen fluorescent layer and the emulsion layer adjacent thereto as well as the overcoat layers 39 and 55 separating the back intensifying screen fluorescent layer and the emulsion layer adjacent thereto are preferably transparent to the emitted longer wavelength electromagnetic radiation. Being transparent to both X-radiation and longer wavelength electromagnetic radiation, the overcoat layers 36, 47, 39, and 55, though preferred for other reasons, are not needed for imaging and can be omitted.

Although a dual coated radiographic element employed with a pair of intensifying screens is shown in FIG. 2, it is apparent that a single intensifying screen and a radiographic element containing a single silver halide emulsion layer can be used for imaging. For example, the front intensifying screen 25 and the layers of the radiographic element lying above the support 29 can be omitted. This simplified arrangement is currently the most widely employed arrangement for mammographic examination. However, the majority of thoracic and abdominal examinations employ the full assembly 7 as shown in FIG. 2.

In the present invention an intensifying screen is provided capable of absorbing X-radiation and emitting electromagnetic radiation principally in the wavelength region to which silver halide exhibits native sensitivity. That is, the intensifying screens of this invention are capable of absorbing an imagewise pattern of X-radiation and emitting a corresponding image pattern at wavelengths principally in the near ultraviolet (300–400 nm) and blue (400–500 nm) regions of the spectrum. This allows the intensifying screens to be employed in combination with silver halide radiographic elements that have not been spectrally sensitized. However, it should be pointed out that the intensifying screens are not restricted to use with silver halide radiographic elements that are free of spectral sensitizing dye, since all silver halide radiographic elements possess native sensitivity in the near ultraviolet and blue portions of the spectrum, even those that have been spectrally sensitized for exposure in other regions Further, it is known to employ spectral sensitizing dyes that have peak absorptions in the blue portion of the spectrum to increase sensitivity.

The present invention has been made possible by providing the intensifying screen with a fluorescent layer that is capable of efficiently absorbing X-radiation and emitting principally in the 300–500 nm region of the spectrum. Specifically, this invention is directed to the discovery that a titanium activated hafnium zirconium germanate phosphor is capable of emitting principally in the 300–500 nm region of the electromagnetic spectrum while also, with proper selection of the ratios of the Group 4 host metal to germanium, exhibiting high emission efficiencies. The emission outputs are, in fact, larger than those realized using titanium activated germania ($GeO_2$) as a phosphor and larger in the region of native silver halide sensitivities than those realized using titanium activated hafnium zirconium germanate as a phosphor with the ratio of the Group 4 (hafnium and zirconium) host metals present to germanium exceeding 1.67. Stated another way, it has been recognized quite unexpectedly that titanium activated hafnium zirconium germanate phosphors with a range of Group 4 host metal to germanium proportions limited to a specific range give the desired 300 to 500 nm principal emission spectrum sought and at the same time yield superior emission intensities.

It has been discovered quite unexpectedly that titanium activated hafnium zirconium germanate phosphors capable of emitting principally in the 300 to 500 nm region of the spectrum and capable of yielding increased emissions in this spectral region are those that satisfy the metal relationship:

$$\text{ti } D_{1+x}Ge_{1-x} \qquad (I)$$

where

D is the combined sum of zirconium and hafnium (i.e., the Group 4 host metal) and x is in the range of from 0.25 to −0.70. In a specifically preferred form of the invention x is up to 0.20, optimally up to 0.15; and x is preferably less negative than −0.50.

The titanium activator can be employed in concentrations that are conventional for Group 4 host metal oxide and germania phosphors. To obtain improved emission intensities it is preferred that the titanium activator satisfy the relationship:

$$[D_{1+x}Ge_{1-x}]_{1-y}Ti_{2y} \qquad (II)$$

where

D and x are as previously defined and 2y is from $5 \times 10^{-4}$ to 0.15.

In a specifically preferred form of the invention 2y is at least $5 \times 10^{-3}$; and 2y is preferably up to 0.07.

The ratio of the Group 4 host metals, hafnium and zirconium, can be widely varied. Although better X-radiation absorption results from increasing the proportion of hafnium in the phosphor, the substitution of zirconium for hafnium has a surprisingly small effect on phosphor emission as compared, for example, to substituting zirconium for hafnium in monoclinic titanium activated hafnia lacking germanium.

While the purest obtainable forms of hafnium can be employed in the practice of this invention without intentionally incorporating zirconium, except as an impurity, it is not necessary to incur the significant expense of using high purity hafnium to realize the advantages of this invention. For example, optical grade hafnia, which exhibits a zirconium concentration of less than $3 \times 10^{-4}$ mole Zr/mole Hf, is not required or preferred for use in the practice of this invention.

Where high, but less than maximum emission levels are acceptable, it is possible to employ zirconium as the Group 4 host metal without intentionally including hafnium, except as a zirconium impurity. Thus, all attainable proportions of hafnium to zirconium are within the contemplation of this invention.

In the preferred forms of the invention the ratios of Group 4 host metals satisfy the relationship:

$$Hf_{1-z}Zr_z \qquad (III)$$

where $z$ is $4 \times 10^{-4}$ to $<0.5$.

In the above relationship $z$ is most preferably at least $1 \times 10^{-3}$ and optimally at least $2 \times 10^{-3}$; and $z$ most preferably ranges up to 0.4 and optimally up to 0.3.

When the preferred ratios of hafnium, zirconium, germanium and titanium are all satisfied, the phosphor metals are described by the following relationship:

$$[(Hf_{1-z}Zr_z)_{1+x}Ge_{1-x}]_{1-y}Ti_{2y} \qquad (IV)$$

where $x$ is 0.25 to $-0.70$;

$2y$ is $5 \times 10^{-4}$ to 0.15; and $z$ is $4 \times 10^{-4}$ to $<0.5$.

Further, $x$ is most preferably up to 0.2, optimally up to 0.15, and most preferably less negative than $-0.50$; $2y$ is most preferably at least $5 \times 10^{-3}$ and most preferably up to 0.07; and $z$ is most preferably at least $1 \times 10^{-3}$, optimally at least $2 \times 10^{-3}$, and most preferably up 0.40, optimally up to 0.30.

In the preferred form of the invention the phosphor consists essentially of germanium, hafnium, zirconium, titanium and oxygen. Since hafnium, zirconium and germanium are each present in the phosphor in a $+4$ oxidation state, it follows that there are 2 oxygen atoms for each atom of these metals present. Thus, in specifically preferred forms of the invention, paralleling the metal ratios of relationships II and IV, the compositions of the phosphor satisfy the relationships:

$$[D_{1+x}Ge_{1-x}]_{1-y}Ti_{2y}O_4 \qquad (V)$$

$$[(Hf_{1-z}Zr_z)_{1+x}Ge_{1-x}]_{1-y}Ti_{2y}O_4 \qquad (VI)$$

where

D, x, 2y and z can take any of the values identified above.

The titanium activated hafnium zirconium germanate phosphors of this invention described above, once formed to satisfy the composition requirements of this invention, can be employed to form an intensifying screen of any otherwise conventional type. In its preferred construction the intensifying screen is comprised of a support onto which is coated a fluorescent layer containing the titanium activated hafnium zirconium germanate phosphor in particulate form and a binder for the phosphor particles. Titanium activated hafnium zirconium germanate phosphors can be used in the fluorescent layer in any conventional particle size range and distribution. It is generally appreciated that sharper images are realized with smaller mean particle sizes. Preferred mean particle sizes for the titanium activated hafnium zirconium germanate phosphors of this invention are in the range of from 0.5 $\mu$m to 40 $\mu$m, optimally from 1 $\mu$m to 20 $\mu$m.

It is, of course, recognized that the titanium activated hafnium zirconium germanate phosphor particles can be blended with other, conventional phosphor particles, if desired, to form an intensifying screen having optimum properties for a specific application. Intensifying screen constructions containing more than one phosphor containing layer are also possible, with the titanium activated hafnium zirconium germanate phosphor particles being present in one or more of the phosphor containing layers.

The fluorescent layer contains sufficient binder to give structural coherence to the titanium activated hafnium zirconium germanate layer. The binders employed in the fluorescent layers can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, Feb. 1977, Item 15444, and intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

The support onto which the fluorescent layer is coated can be of any conventional type. Most commonly, the support is a film support. For highest levels of image sharpness the support is typically chosen to be black or transparent and mounted in a cassette for exposure with a black backing. For the highest attainable speeds a white support, such as a titania or barium sulfate loaded or coated support is employed. Specifically preferred reflective supports offering the highest attainable balance of speed and sharpness are those containing reflective microlenslets, disclosed by Roberts et al U.S. Pat. No. 4,912,333.

Any one or combination of conventional intensifying screen features, such as overcoats, subbing layers, and the like, compatible with the features described above can, of course, be employed. Both conventional radiographic element and intensifying screen constructions are disclosed in Research Disclosure, Vol. 184, Aug. 1979, Item 18431, the disclosure of which and the patents cited therein are here incorporated by reference. Research Disclosure is published by Kenneth Mason Publications, Ltd., Emsworth, Hampshire PO10 7DD, England.

In one specifically preferred form of the invention, illustrating intensifying screens satisfying the requirements of the invention intended to be employed with a separate silver halide emulsion layer containing radiographic element, the phosphor described above can be substituted for any of the conventional phosphors employed in either the front or back intensifying screens of Luckey, Roth et al U.S. Pat. No. 4,710,637, the disclosure of which is here incorporated by reference. Similar modification of any of the conventional intensifying screens disclosed in the following patents is also contemplated: DeBoer et al U.S. Pat. No. 4,637,898; Luckey, Cleare et al U.S. Pat. No. 4,259,588; Luckey U.S. Pat. No. 4,032,471; and Roberts et al, cited above.

Although the utility of the phosphors has been described by specific reference to X-ray intensifying screens, it is appreciated that the phosphors can be applied to different end uses, if desired. For example, the phosphors can be excited with ultraviolet radiation or cathode rays; thus, the phosphors can be used in fluorescent lamps and in cathode ray tubes, desired.

EXAMPLES

The invention can be better appreciated by reference to the following specific examples. Examples with a number bearing the suffix E represent preferred embodiments of the invention while Examples with a number bearing the suffix C are included for the purpose of comparing variations.

DESCRIPTION OF MEASUREMENT PROCEDURES EMPLOYED

The relative luminescence of the response of the phosphor powder was measured by packing the phosphor powder into aluminum planchets (2 mm high × 24 mm diameter) at a coverage of about 1 g/cm$^2$ and exposing the sample to filtered X-radiation. The X-ray source was a tungsten target tube in a XRD 6 TM generator operating at 28 kVp and 30 mA. The filtration consisted of 1.31 mm of aluminum and 0.05 mm of molybdenum. The luminescence response was measured using an IP-28 TM photomultiplier tube at 500 V bias. The voltage from the photomultiplier was measured with a Keithley TM high impedance electrometer and is proportional to the total light output of the sample.

Emission spectra were obtained with an instrument consisting of an Instruments S.A. Model HR 320 TM grating spectrometer coupled with a Princeton Applied Research Model 1421 TM intensified linear diode array detector. The data acquisition and processing was controlled by a Princeton Applied Research Model 1460 OMA III TM optical multichannel analyzer. Spectra were corrected for the spectral response of the detector-spectrograph combination. Samples were placed in planchets as described above and irradiated with X-rays from a tungsten-target tube operated at 70 kVp and 40 mA in an Enraf-Nonius Diffractis 582 TM constant potential generator. Depending on the magnitude of the luminescence response of the sample, 0.8 mm of aluminum filtration was used.

EXAMPLES 1-9

Group 4 Host Concentration Equals or Exceeds That of Ge in Phosphor $[(Hf_{0.9974}Zr_{0.0026})_{(1+x)}Ge_{(1-x)}]_{0.9875}Ti_{0.025}O_4$ (x=0.0 to 0.5).

These examples demonstrate the luminescence response of titanium activated hafnium zirconium germanate phosphors in which the molar concentration of the Group 4 host metals equals or exceeds that of germanium.

Examples 1-9 were prepared using 4.0 g of GeO$_2$ (Eagle Picher, chemical grade 99.999%). The appropriate molar amounts of RGS HfOCl$_2$.8H$_2$O (Teledyne Wah Chang Albany, Zr=0.26 mol %) and (NH$_4$)$_2$TiO(C$_2$O$_4$)$_2$.H$_2$O (Johnson Matthey, Puratronic, 99.998%) were dissolved in 250 mL of distilled water. After the solution was filtered, the solid GeO$_2$ was added with vigorous stirring. Concentrated NH$_4$OH (Eastman Kodak Company, ACS reagent) was slowly added until the solution pH reached approximately 8-9. The resulting precipitate was collected by vacuum filtration and dried at 95° C. The dried material was washed twice with 100 mL of methanol and dried at 95° C.

Portions of the samples were ground in an agate mortar and then placed in 10 mL alumina crucibles, covered with alumina lids and fired at 1200° C. for 4 hours in a box furnace.

The relative luminescence intensities for these examples are set out in Table I, with the luminescence intensity of Example 9 being assigned a value of 100 to provide a convenient point of reference.

TABLE I

| Example | x | Relative Intensity (Ex 9 = 100) | Peak max (nm) |
| --- | --- | --- | --- |
| 1E | 0.00 | 3224 | 425 |
| 2E | 0.02 | 3267 | |
| 3E | 0.05 | 2948 | |
| 4E | 0.11 | 1771 | |
| 5E | 0.16 | 1095 | 440 |
| 6E | 0.23 | 643 | |
| 7C | 0.31 | 333 | 450 |
| 8C | 0.38 | 190 | |
| 9C | 0.50 | 100 | 465 |

It is apparent from Table I that relative luminescence is higher at the higher levels of germanium. The wavelength of peak emission shifts gradually from 425 nm to 465 nm, with full width emission bands (bands bounded on each side of maximum emission by half of maximum emission levels) ranging from 100-125 nm. The titanium activated HfGeO$_4$ (x=0) composition described in Example 1E was verified to have a scheelite crystal structure by X-ray powder diffraction. In the remaining examples a tetragonal crystal structure was maintained.

When a similar titanium activated phosphor was compared in which x=1.0 (i.e., a hafnia phosphor), a broad band emission centered at 480 nm was observed. Because the peak emission was close to 500 nm, a large part of the emission was in the green (500-600 nm) portion of the spectrum. The green emission could not, of course, be absorbed by a silver halide radiographic element absent spectral sensitization. Maintaining x at 0.25 or less keeps not only peak emission, but almost all of the full width emission band as defined above within the spectral region of native silver halide sensitivity.

EXAMPLE 10-15

Ge Concentration Equals or Exceeds That of Group 4 Host in Phosphor $[(Hf_{0.9974}Zr_{0.0026})_{(1+x)}Ge_{(1-x)}]_{0.9875}Ti_{0.025}O_4$ (x=0.0 to −1.0).

These examples demonstrate the luminescence response of titanium activated the luminescence response of titanium activated hafnium zirconium germanate phosphors in which the molar concentration of germanium equal or exceeds that of the Group 4 host metals.

Examples 10-13 were prepared using 4.0 g of GeO$_2$ (Eagle Picher, chemical grade 99.999%). The appropriate molar amount of RGS HfOCl$_2$.8H$_2$O (Teledyne Wah Chang Albany, Zr=0.26 mol %) and $(NH_4)_2TiO(C_2O_4)_2 \cdot H_2O$ (Johnson Matthey, Puratronic, 99.998%) were dissolved in 250 mL of distilled water. Two grams of ammonium chloride (Eastman Kodak Company, ACS reagent) were added to the solution. In Example 14, 8 g of GeO and 4 g of ammonium chloride were used. After the solution was filtered, the solid $GeO_2$ was added with vigorous stirring. Concentrated $NH_4OH$ (Eastman Kodak Company, ACS reagent) was slowly added until the solution pH reached approximately 10. The resulting precipitate was collected by vacuum filtration and dried at 95° C. The dried material was washed twice with 100 mL of methanol and allowed to air dry.

The samples were ground in an agate mortar and then placed in 20 mL alumina crucibles covered with alumina lids and fired at 1000° C. for 4 hours in a box furnace. The samples were then reground and heated in 10 mL alumina crucibles at 1100° C. for 4 hours in a tube furnace. The firing temperature was limited because of the relatively low melting point of $GeO_2$ and the high volatility of molten $GeO_2$.

X-ray powder diffraction showed that for negative values of x, the samples were mixtures of $HfGeO_4$ (x=0) and hexagonal $GeO_2$, indicating that no significant degree of solid solution exists in this compositional region. In Example 14, a minor amount of tetragonal $GeO_2$ was observed in addition to the hexagonal form.

Titanium-activated tetragonal $GeO_2$ (Example 15) was prepared as follows: The dried precursor described in Example 14 was fired in an alumina crucible at 1000° C. for 4 hours in a box furnace. The powder was then ground with 1 wt % of $K_2CO_3$ (Alfa Ventron, Ultrapure grade) in an agate mortar and heated in an alumina boat at 850° C. for 18 hours in a tube furnace. The sample was reground with an additional 1 wt % $K_2CO_3$ and reheated at 890° C. for 18 hours in a box furnace. X-ray diffraction confirmed the conversion of the hexagonal structure to that of the tetragonal form.

Blue luminescence was observed for all of the samples. The relative luminescence intensities for these examples are set out in Table II.

TABLE II

| Example | x | Relative Intensity (Ex 9 = 100) |
|---|---|---|
| 10E | 0.00 | 1748 |
| 11E | −0.11 | 1210 |
| 12E | −0.31 | 1219 |
| 13E | −0.70 | 648 |
| 14C | −1.00 | 43 |
| 15C* | −1.00 | 286 |

*tetragonal $GeO_2$

The relative luminescence intensity decreased sharply at values of x more negative than −0.70, with the highest levels of luminescence occurring when x is less negative than −0.50. Differences in the crystallographic forms of titanium activated germania influenced luminescence, but the quantity of hafnium present was the predominant influence on luminescence.

EXAMPLES 16–31

Varied Levels of Titanium Activation $(Hf_{0.9974}Zr_{0.0026}Ge)_{1-y}Ti_{2y}O_4$ (2y=0.001 to 0.162)

These examples demonstrate the utility of varied levels of titanium incorporation.

A hydrous hafnia precursor was prepared by the simultaneous addition of a hafnium oxychloride solution (205 g RGS Teledyne Wah Chang Albany; 0.26 mol % Zr, in 485 mL distilled water) and sodium hydroxide solution (44.5 g Eastman Kodak Company ACS reagent in 485 mL distilled water) to 2000 mL of rapidly stirred distilled water. The resulting gelatinous material was collected by vacuum filtration and dried for 8 hours at 100° C. on a rotary evaporator under 51 cm of vacuum. The dried material was washed three times with 2300 mL distilled water and dried 72 hours at 95° C.

The hydrous hafnia precursor was combined with the appropriate amounts of $GeO_2$ (Kawecki Berylco Industries, hereinafter referred to as KBI, 99.999%), $TiO_2$ (Aldrich, 99.99%) and 11 wt % $Li_2MoO_4$ (Aesar, 99%). In Example 22, 3.4751 g of hydrous hafnia, 1.4642 g $GeO_2$, 0.0228 g of $TiO_2$ and 0.5463 g $Li_2MoO_4$ were ground together with an agate mortar and pestle. The charges were placed in 10 mL alumina crucibles, covered with alumina lids and fired at 1100° C. for 6 hours in a box furnace. After cooling, the samples were washed in 150 mL of distilled water to dissolve the flux, dried at 95° C., and then reheated at 500° C.

The compositions were verified to have a scheelite crystal structure by X-ray powder diffraction. The emission peak for the titanium activated compositions remained at 425 nm throughout the range of y values described in these examples.

The relative luminescence intensities for these examples are set out in Table III.

TABLE III

| Example | 2y | Relative Intensity (Ex 9 = 100) |
|---|---|---|
| 16E | 0.001 | 2457 |
| 17E | 0.0025 | 2890 |
| 18E | 0.005 | 3124 |
| 19E | 0.010 | 3333 |
| 20E | 0.013 | 3400 |
| 21E | 0.017 | 3410 |
| 22E | 0.020 | 3443 |
| 23E | 0.025 | 3543 |
| 24E | 0.030 | 3467 |
| 25E | 0.041 | 3376 |
| 26E | 0.051 | 3290 |
| 27E | 0.065 | 3110 |
| 28E | 0.078 | 2948 |
| 29E | 0.105 | 2748 |
| 30E | 0.133 | 2490 |
| 31C | 0.162 | 2181 |

Limited variance of luminescence output as a function of titanium concentration was observed; however, higher levels of luminescence were observed with titanium concentrations of up to 0.15, with titanium concentrations of from 0.005 to 0.07 demonstrating optimum performance.

EXAMPLES 32–46

Varied Levels of Zirconium $(Hf_{1-z}Zr_z)_{0.9875}Ti_{0.025}O_4$ (z=2.76×10$^{-4}$ to 1.00)

The purpose of these examples is to demonstrate the dependence of the luminescence output on zirconium concentration in titanium activated hafnium zirconium germanate phosphor samples. The samples contain a titanium concentration which lies in the middle of the preferred range described in Examples 16–31.

Each sample was prepared using 3.5 g of $GeO_2$ (Eagle Picher, electronic grade 99.9999%). The appropriate molar amounts of $HfOCl_2.8H_2O$ and $(NH_4)_2TiO(C_2O_4)_2.H_2O$ (Aldrich Gold Label, 99.998%) were dissolved in 250 mL of distilled water and the solution filtered. For Examples 32-35, combinations of optical grade $HfOCl_2.8H_2O$ (Teledyne Wah Chang Albany; 0.0276 mol % Zr) and RGS $HfOCl_2.8H_2O$ (Teledyne Wah Chang Albany; 0.26 mol % Zr) were used. For the remaining examples, combinations of RGS $HfOCl_2.8H_2O$ and RGS $ZrOCl_2.8H_2O$ (Teledyne Wah Chang Albany; 0.0042 mol % Hf) were used. After the solid $GeO_2$ was added to the vigorously stirred solution, 7.5 mL of concentrated $NH_4OH$ (Eastman Kodak Company, ACS reagent) was slowly added. The resulting precipitate was collected by vacuum filtration and dried at 95° C. The dried material was washed in 30 mL of distilled water for 30 minutes and then redried at 95° C. Each of the powders was ground with 11 wt % $Li_2MoO_4$ (Aesar, 99%) in an agate mortar and then placed in a 10 mL alumina crucible covered with alumina lid and fired at 1100° C. for 6 hours in a box furnace. After cooling, the samples were washed in 150 mL of distilled water to dissolve the flux, dried at 95° C., and then reheated at 500° C.

The compositions were verified to have a scheelite crystal structure by X-ray powder diffraction. The emission spectra was similar for all the samples in the series. Only a slight shift of the peak maximum from 425 nm (z=0.000276) to 430 nm (z=1.00) is observed. The full width emission band (defined by half of maximum emission levels) was 105-110 nm for all samples. The relative luminescence intensities for these examples are set out in Table IV.

TABLE IV

| Example | z | Relative Intensity (Ex 9 = 100) |
|---|---|---|
| 32E | 0.000276 | 4243 |
| 33E | 0.0004 | 4162 |
| 34E | 0.001 | 4210 |
| 35E | 0.0026 | 4262 |
| 36E | 0.005 | 4262 |
| 37E | 0.01 | 4343 |
| 38E | 0.02 | 4243 |
| 39E | 0.05 | 4352 |
| 40E | 0.10 | 4110 |
| 41E | 0.20 | 4095 |
| 42E | 0.30 | 4043 |
| 43E | 0.40 | 3819 |
| 44E | 0.50 | 3643 |
| 45E | 0.75 | 3443 |
| 46E | 0.999958 | 3367 |

The relative luminescence outputs were high for all levels of zirconium, but higher performance was obtained for values of z of <0.50. The highest levels of performance were achieved when z was up to 0.40.

EXAMPLES 47-51

Varied Amounts of Flux in Phosphor Preparation $[Hf_{0.9975}Zr_{0.0025}]_{0.995}Ge_{0.995}Ti_{0.01}O_4$ The purpose of these examples is to show the effect of varying amounts of $Li_2MoO_4$ flux on the luminescence output, particle size and crystallinity of titanium-activated $HfGeO_4$.

A hafnium zirconium germanate precursor was prepared as follows: 75.830 g of RGS $HfOCl_2.8H_2O$ (Teledyne Wah Chang Albany; 0.26 mol % Zr) and 0.55 g of $(NH_4)_2TiO(C_2O_4)_2.H_2O$ (Aldrich Gold Label, 99.998%) were dissolved in 500 mL of distilled water. After filtration, 20 g of solid $GeO_2$ (KBI, 99.999%) was added to the vigorously stirred solution. A gelatinous precipitate was produced by the slow addition of 25 mL of concentrated $NH_4OH$ (Eastman Kodak Company, ACS reagent). The precipitate was collected by vacuum filtration and dried at 95° C. The dried material was washed in 150 mL of distilled water for 30 minutes and redried at 95° C.

From the foregoing description it is apparent that a slight excess of germanium was introduced that resulted in a small amount of a separate germania phase being formed, not reflected in the title formula.

Five gram portions of the precursor were ground with varying portions of $Li_2MoO_4$ (Aesar, 99%) in an agate mortar and then placed in 10 mL alumina crucibles, covered with alumina lids and fired at 1000° C. for 6 hours in a box furnace. After cooling, the samples were washed in 150 mL of distilled water to dissolve the flux, dried at 95° C., and then reheated at 500° C.

A scheelite crystal structure was verified by X-ray powder diffraction in all of the samples. The relative luminescence intensities for these examples are set out in Table V.

TABLE V

| Example | wt % Flux | Relative Intensity (Ex 9 = 100) |
|---|---|---|
| 47C* | None | 43 |
| 48E | 5.5 | 2767 |
| 49E | 11 | 3100 |
| 50E | 44 | 2590 |
| 51E | 88 | 1152 |

*Preparation failure, see Example 52

The relative luminescence output intensity appears to peak at approximately 11 wt % $Li_2MoO_4$, and then decreases with increasing flux concentration. The flux preparations yield uniform 2-8 μm unagglomerated particles of titaniun activated hafnium zirconiun germanate phosphor at a low firing temperature. Although a low luminescence intensity was obtained in Example 47 in the absence of flux, Example 52 below demonstrates that useful phosphors according to the invention can be made without flux by using higher firing temperatures.

EXAMPLES 52-59

Varied Flux Compounds $(Hf_{0.9974}Zr_{0.0026})_{0.995}Ge_{0.995}Ti_{0.01}O_4$

The purpose of these examples is to show the applicability of a variety of fluxes in the preparation of titanium activated hafnium zirconium germanate phosphors satisfying the requirements of this invention.

A hafnium zirconium germanate precursor was prepared as in Examples 47-51.

Five gram portions of the precursor were ground in an agate mortar with one of the following fluxes: 1 wt % LiF (Johnson Mathey, Puratronic), 1 wt % $Li_2CO_3$ (Alfa, Ultrapure), 11 wt % $Na_2MoO_4$ (Aesar, reagent), 11 wt % $Na_2WO_4$ (Eastman Kodak Company, dehydrated ACS reagent), 11 wt % $Li_2MoO_4$ (Aesar, 99% reagent), 11 wt % $Li_2WO_4$ (Aesar, 99.9%) and 11 wt % $K_2WO_4$ (Aesar, 99.9%). The mixtures were then placed in 10 mL alumina crucibles, covered with alumina lids and fired at 1100° C. for 6 hours in a box furnace. After cooling, the samples were washed in 150 mL of distilled water to dissolve the flux, dried at 95° C., and then reheated at 500° C.

The relative luminescence intensities for these examples are set out in Table VI.

EXAMPLE 60-68

Varied Flux Compounds $(Hf_{0.9975}Zr_{0.0025})_{0.995}Ge_{0.995}Ti_{0.01}O_4$

The purpose of these examples is to show the effect of using additional fluxes on the luminescence output of titanium activated hafnium zirconium germanate phosphors satisfying the requirements of the invention.

A hafnium zirconium germanate precursor was prepared as follows: 167.8 g of RGS $HfOCl_2.8H_2O$ (Teledyne Wah Chang Albany; 0.26 mol % Zr) and 1.302 g of $(NH_4)_2TiO(C_2O_4)_2.H_2O$ (Johnson Matthey, Puratronic TM, 99.998%) were dissolved in 500 mL of distilled water. After filtration, 42.86 g of solid $GeO_2$ (Eagle Picher, Chemical grade, 99.999%) was added to the vigorously stirred solution. A gelatinous precipitate was produced by the slow addition of 78 mL of concentrated $NH_4OH$ (Eastman Kodak Company, ACS reagent). The precipitate was collected by vacuum filtration and dried at 95° C. The dried material was washed in 360 mL of distilled water for 45 minutes and redried at 95° C. The dried material was washed in 360 mL of distilled water for 45 minutes and redried at 95° C.

EXAMPLE 60

A five gram portion of the above precursor was ground with 6 wt % of $K_2MoO_4$ (see Gatehouse and Leverett in J. Chem. Soc. (A), p. 849 (1969) for preparation) in an agate mortor and then placed in 10 mL alumina crucibles, covered with alumina lids, and fired at 1100° C. for 6 hours in a box furnace After cooling, the samples were washed in 150 mL of distilled water to dissolve the flux, dried at 95° C. and then reheated at 500° C.

EXAMPLE 61

A 4.5 gram portion of the above precursor was ground with 7 wt % of $LiBO_2$ (Johnson Matthey) in an agate mortor and then placed in 10 mL alumina crucibles, covered with alumina lids, and fired at 950° C. for 6 hours in a box furnace. After cooling, the samples were washed in 150 mL of hot distilled water to dissolve the flux and dried at 95° C.

EXAMPLES 62-67

Separate 4.5 gram portions of the above precursor were ground in an agate mortar with one of the following amounts of alkali metal sulfate flux: 3 or 15 wt % of $Li_2SO_4$ (dehydrated Alfa $Li_2SO_4.H_2O$, reagent grade); 4 or 20 wt % of $NaSO_4$ (Baker, reagent grade); 5 or 25 wt % of $K_2SO_4$ (Mallinkrodt, reagent grade). The mixtures were then placed in 10 mL alumina crucibles, covered with alumina lids, and placed in a box furnace. The samples were fired for 6 hours at the temperatures of 800°, 900°, 1000° and 1100° C. with intermediate grindings. After the final cooling, the samples were washed in 150 mL of distilled water to dissolve the flux and dried at 95° C.

EXAMPLE 68

A 57.3 gram portion of a hafnium germanate precursor prepared as described above was ground with 8 wt % of $Li_2SO_4$ (Johnson Matthey, anhydrous, 99.7%) in an agate mortar and then placed in a 100 mL alumina crucible, covered with an alumina lid, and fired at 1000° C. for 12 hours in a box furnace. After cooling, the sample was ground and then replaced in the crucible and refired at 1100° C. for 6 hours. The sample was then washed twice with 1500 mL of hot distilled water and dried.

The relative luminescence intensities for these examples are set out in Table VI.

TABLE VI

| Example | Flux | Relative Intensity (Ex 9 = 100) |
|---|---|---|
| 52E | None | 2138 |
| 53E | 1 wt % LiF | 3876 |
| 54E | 1 wt % $Li_2CO_3$ | 4838 |
| 55E | 11 wt % $Na_2MoO_4$ | 4929 |
| 56E | 11 wt % $Na_2WO_4$ | 4695 |
| 57E | 11 wt % $Li_2MoO_4$ | 4219 |
| 58E | 11 wt % $Li_2WO_4$ | 3876 |
| 59E | 11 wt % $K_2WO_4$ | 4719 |
| 60E | 6 wt % $K_2MoO_4$ | 3489 |
| 61E | 7 wt % $LiBO_2$ | 5411 |
| 62E | 3 wt % $Li_2SO_4$ | 5878 |
| 63E | 15 wt % $Li_2SO_4$ | 5333 |
| 64E | 4 wt % $Na_2SO_4$ | 3444 |
| 65E | 20 wt % $Na_2SO_4$ | 2667 |
| 66E | 5 wt % $K_2SO_4$ | 3100 |
| 67E | 25 wt % $K_2SO_4$ | 1267 |
| 68E | 8 wt % $Li_2SO_4$ | 6233 |

Example 52 shows a higher relative luminescence output than that of Example 47 because of an improved crystallinity produced by a higher firing temperature. All of the remaining Examples demonstrated higher relative luminescence intensities and better particle size uniformities than the non-flux preparation.

EXAMPLE 69

Phosphor Preparation by Spray Drying $(Hf_{0.9974}Zr_{0.0026})_{0.995}Ge_{0.995}Ti_{0.01}O_4$ This example demonstrates a spray drying preparation of the titanium activated hafnium zirconium germanate phosphor.

An aqueous germanium oxide solution was prepared by dissolved 20 g of $GeO_2$ (KBI 99.999%) in 165 mL of distilled $H_2O$ by the slow addition of 6 mL of concentrated $NH_4OH$ (Eastman Kodak Company, ACS reagent). A second solution was prepared which contained 0.55 g of ammonium bis(oxalato)oxotitanium (IV), $(NH_4)_2TiO(C_2O_4)_2.H_2O$ (Aldrich, Gold Label, 99.998%), in addition to 78.3 g of RGS $HfOCl_2.8H_2O$ (Teledyne Wah Chang Albany; 0.26 mol % Zr) dissolved in 335 mL of distilled water. Each solution was filtered, and then slowly added at the same time to 335 mL of vigorously stirred distilled water. This solution was then slowly added to a 1000 mL aqueous base solution containing 23.8 mL of concentrated $NH_4OH$ (Eastman Kodak Company, ACS reagent).

The resulting gel was peristaltically pumped into a Niro Portable Spray Dryer TM equipped with a rotary atomizer. The inlet air temperature was maintained at 225° C., and the outlet air temperature equilibrated to 95° C. The collected powder was dried at 95° C. A 12 g portion was washed in 30 mL of distilled water for 30 minutes, and redried at 95° C. The sample consisted of spheres of 2-10 μm in diameter. A 6 g aliquot was placed in a 10 mL alumina crucible, covered with alumina lid and fired at 1250° C. for 6 hours in a box furnace. After firing, the phosphor particle size was reduced to 1-5 μm. The crystal structure was verified to be that of $HfGeO_4$ by X-ray powder diffraction. The relative luminescence intensity was 3619.

A specific advantage to this method is in particle size control.

EXAMPLE 70

Intensifying Screen

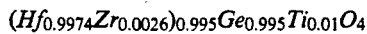

This example demonstrates intensifying screen construction and performance.

The hafnium zirconium germanate precursor was prepared as described in Examples 47-51. Five 30 g portions of precursor were combined with 11 wt % $Li_2MoO_4$ (Aesar 99%) and ground in an agate mortar. The mixtures were placed in separate alumina crucibles, covered with alumina lids and fired at 1100° C. for 6 hours in a box furnace. After cooling, the samples were washed in 500 mL of distilled water to dissolve the flux, dried at 95° C., and then reheated at 500° C. The relative luminescence intensity of the combined phosphor powders was 4605.

The phosphor was mixed with a 13% Permuthan TM polyurethane solution in a methylene chloride and methanol mixture to produce a dispersion with 21 parts of phosphor to 1 part of binder by weight. The mixture was agitated for 4 hours on a paint shaker using zirconia beads. The dispersion was then coated on a blue-tinted transparent poly(ethylene terephthalate) film support to produce a coating with about 2.37 g/dm² of phosphor. When excited by X-radiation from a tungsten target tube operated at 28 kVp and 30 mA and filtered with 1.31 mm of aluminum and 0.05 mm of molybdenum, this coating gives a speed 1.96 times larger than that obtained from a commercial $CaWO_4$ (Par TM screen) when the responses are compared using an IP-28 TM photomultiplier tube.

The invention has been described in detail with particular reference to preferred embodiments thereof, but it will be understood that variations and modifications can be effected within the spirit and scope of the invention.

What is claimed is:

1. An intensifying screen comprised of
   a support and
   a fluorescent layer containing a phosphor capable of absorbing X-radiation and emitting electromagnetic radiation principally in the spectral region to which silver halide exhibits native sensitivity, characterized in that the phosphor is titanium activated hafnium zirconium germanate in which hafnium, zirconium and germanium satisfy the relationship:

$$D_{1+x}Ge_{1-x}$$

where
D is the combined sum of zirconium and hafnium and x is 0.25 to −0.70.

2. An intensifying screen comprised of
   a support and
   a fluorescent layer containing a phosphor capable of absorbing X-radiation and emitting electromagnetic radiation principally in the 300 to 500 nm region of the spectrum, characterized in that the phosphor consists essentially of oxygen and metals satisfying the relationship:

$$[(Hf_{1-z}Zr_z)_{1+x}Ge_{1-x}]_{1-y}Ti_{2y}$$

where
x is 0.25 to −0.70;
2y is $5 \times 10^{-4}$ to 0.15; and
z is at least $4 \times 10^{-4}$.

3. An intensifying screen according to claim, 2 further characterized in that x is up to 0.20.

4. An intensifying screen according to claim 3 further characterized in that x is up to 0.15.

5. An intensifying screen according to claim 2 further characterized in that x less negative than −0.50.

6. An intensifying screen according to claim 2 further characterized in that 2y is at least $5 \times 10^{-3}$.

7. An intensifying screen according to claim 2 further characterized in that 2y is up to 0.07.

8. An intensifying screen according to claim 2 further characterized in that 2y is less than 0.5.

9. An intensifying screen according to claim 8 further characterized in that z is up to 0.4.

10. An intensifying screen according to claim 9 further characterized in that z is up to 0.3.

11. An intensifying screen according to claim 2 further characterized in that z is at least $1 \times 10^{-3}$.

12. An intensifying screen according to claim 11 further characterized in that z is at least $2 \times 10^{-3}$.

13. A phosphor composition comprised of titanium activated hafnium zirconium germanate in which hafnium, zirconium and germanium satisfy the relationship:

$$D_{1+x}Ge_{1-x}$$

where
D is the combined sum of zirconium and hafnium and x is 0.25 to −0.70.

14. A phosphor composition according to claim 13 in which the phosphor consists essentially of oxygen and metals satisfying the relationship:

$$[(Hf_{1-z}Zr_z)_{1+x}Ge_{1-x}]_{1-y}Ti_{2y}$$

where
x is 0.25 to −0.70;
2y is $5 \times 10^{-4}$ to 0.15; and
z is at least $4 \times 10^{-4}$.

15. A phosphor composition according to claim 14 in which x is up to 0.20.

16. A phosphor composition according to claim 15 in which x is up to 0.15.

17. A phosphor composition according to claim 14 in which x less negative than −0.50.

18. A phosphor composition according to claim 14 in which 2y is at least $5 \times 10^{-3}$.

19. A phosphor composition according to claim 14 in which 2y is up to 0.07.

20. A phosphor composition according to claim 14 in which 2y is less than 0.5.

21. A phosphor composition according to claim 20 in which z is up to 0.4.

22. A phosphor composition according to claim 21 in which z is up to 0.3.

23. A phosphor composition according to claim 14 in which z is at least $1 \times 10^{-3}$.

24. A phosphor composition according to claim 23 in which z is at least $2 \times 10^{-3}$.

* * * * *